US011930097B2

(12) United States Patent
Gandhi et al.

(10) Patent No.: US 11,930,097 B2
(45) Date of Patent: Mar. 12, 2024

(54) INTEGRATED ORCHESTRATION OF INTELLIGENT SYSTEMS

(71) Applicant: TTEC Digital, LLC, Englewood, CO (US)

(72) Inventors: Dipesh S. Gandhi, Buda, TX (US); Russell N. Harvey, III, Lunenburg, MA (US)

(73) Assignee: TTEC Holdings, Inc., Englewood, CO (US)

( * ) Notice: Subject to any disclaimer, the term of this patent is extended or adjusted under 35 U.S.C. 154(b) by 48 days.

(21) Appl. No.: 17/499,931

(22) Filed: Oct. 13, 2021

(65) Prior Publication Data

US 2022/0116485 A1   Apr. 14, 2022

Related U.S. Application Data

(60) Provisional application No. 63/091,854, filed on Oct. 14, 2020.

(51) Int. Cl.
*H04L 69/14* (2022.01)
*H04L 51/02* (2022.01)
(Continued)

(52) U.S. Cl.
CPC ............ *H04L 69/14* (2013.01); *H04L 51/02* (2013.01); *H04L 51/216* (2022.05); *H04L 65/1069* (2013.01)

(58) Field of Classification Search
CPC ....... H04L 69/14; H04L 51/02; H04L 51/216; H04L 65/1069; H04L 67/02;
(Continued)

(56) References Cited

U.S. PATENT DOCUMENTS 6,188,761 B1 * 2/2001 Dickerman ............. H04M 3/51
  379/91.01
6,389,400 B1   5/2002 Bushey
(Continued)

FOREIGN PATENT DOCUMENTS

WO   WO 2019/034805   2/2019
WO   WO 2020/136680   7/2020

OTHER PUBLICATIONS

International Searching Authority, International Search and Written Opinion, dated Jan. 12, 2022 in PCT/US 2021/054651.

*Primary Examiner* — Suraj M Joshi
*Assistant Examiner* — Jaren Means
(74) *Attorney, Agent, or Firm* — Critical Path IP Law, LLC

(57) ABSTRACT

Systems and methods for integrated orchestration of intelligent systems. An intelligent systems orchestration system harvests and combines aspects of disparate intelligent systems for use in intelligent virtual assistant applications and automation applications. In one aspect, the system provides an intelligent orchestration between cognitive plugins, such as natural language processing, sentiment analysis, speech recognition, text-to-speech, and computer vision. The intelligent systems orchestration system supports the building and deployment of cognitive applications (e.g., training, agent assist, customer assist, next best action and compliance) for enhancing a brand customer experience, and agent proficiency. The system also provides multi-IVA orchestration and supports session, context, and state management. Furthermore, the intelligent systems orchestration system includes a Conversation Control Language for the normalization of conversations across multiple channels and bots.

20 Claims, 6 Drawing Sheets

(51) Int. Cl.
*H04L 51/216* (2022.01)
*H04L 65/1069* (2022.01)

(58) Field of Classification Search
CPC ..... H04L 65/103; H04L 65/765; H04L 65/70; G06F 16/3329; G06F 40/35
See application file for complete search history.

(56) References Cited

U.S. PATENT DOCUMENTS

| | | | |
|---|---|---|---|
| 6,549,949 B1* | 4/2003 | Bowman-Amuah | ... H04L 69/06 709/236 |
| 10,572,517 B2 | 2/2020 | Canim | |
| 10,936,828 B2* | 3/2021 | Le | ............... G06N 3/045 |
| 2013/0268260 A1* | 10/2013 | Lundberg | ............ G06F 11/3664 704/8 |
| 2014/0095501 A1* | 4/2014 | Niheu | ................ G06Q 10/063 707/736 |
| 2016/0099892 A1* | 4/2016 | Palakovich | ............. H04L 51/04 709/206 |
| 2017/0180284 A1* | 6/2017 | Smullen | ................. H04L 69/14 |
| 2017/0344889 A1 | 11/2017 | Sengupta | |
| 2017/0366621 A1* | 12/2017 | Sagar | .................... H04L 67/148 |
| 2018/0212904 A1* | 7/2018 | Smullen | ................. H04L 51/04 |
| 2019/0044829 A1 | 2/2019 | Balzer | |
| 2019/0102078 A1* | 4/2019 | Bhatt | .................... G06F 3/0481 |
| 2019/0188268 A1* | 6/2019 | Le | ........................ G06F 40/242 |
| 2019/0281159 A1* | 9/2019 | Segalis | ............... H04M 3/4936 |
| 2019/0311374 A1 | 10/2019 | Dai | |
| 2020/0111377 A1* | 4/2020 | Truong | ..................... G09B 5/12 |
| 2020/0134022 A1* | 4/2020 | Millius | ................... G06F 40/56 |
| 2020/0249743 A1 | 8/2020 | Kumar Addepalli | |
| 2020/0293465 A1 | 9/2020 | Yang | |
| 2020/0311560 A1 | 10/2020 | Magin | |
| 2020/0334740 A1* | 10/2020 | Bedell | ................. G06Q 30/0641 |
| 2021/0241241 A1* | 8/2021 | Lokanath | ............. G06Q 20/065 |
| 2021/0350263 A1* | 11/2021 | Koneru | .................. G06N 5/043 |
| 2021/0392093 A1* | 12/2021 | Mia | ....................... G06F 16/955 |
| 2022/0021630 A1* | 1/2022 | Goyal | ...................... G06N 3/08 |

* cited by examiner

INTEGRATED ORCHESTRATION OF INTELLIGENT SYSTEMS

CROSS-REFERENCE TO RELATED APPLICATION

This application is a nonprovisional patent application of and claims the benefit of U.S. Provisional Patent Application No. 63/091,854, filed Oct. 14, 2020 and titled "Integrated Orchestration of Intelligent Systems," the disclosure of which is hereby incorporated herein by reference in its entirety.

FIELD

The disclosure relates generally to the integrated orchestration of intelligent systems, and more specifically to systems and methods of harvesting and combining aspects of disparate intelligent systems for use in intelligent virtual assistant applications and automation applications.

BACKGROUND

Existing intelligent systems use unique components to provide cognitive services. Each intelligent system has a set of specialized components unique to that particular system, such components enabling functions such as programming, operation, and training of the intelligent system. Furthermore, existing intelligent systems have unique software interfaces requiring customized and time-consuming integration across other intelligent systems. When a set of intelligent systems providing cognitive services are implemented in an intelligent virtual assistant environment, custom integrations between input channels, human agents, and the cognitive engines of the disparate intelligent systems are required. Such custom integrations are typically complex, requiring substantial effort in time and resources for implementation. Maintenance and upgrade to such integrations are also resource intensive and problematic, compromising overall system stability and reliability.

What is needed is an intelligent systems orchestration system that efficiently and effectively integrates a set of disparate intelligent systems for use in intelligent virtual assistant (IVA) applications. The disclosure solves this need. The disclosed intelligent systems orchestration system provides many benefits, such as the ability to mix and match, and combine, cognitive sources from disparate intelligent systems sources such that the overall system is agnostic to any particular intelligent system and associated specialized components. The disclosed system also allows exposure or training of systems to occur through a unified means, rather than through multiple disparate means as is conventional, and to expose or train systems by way of multiple channels.

The phrases "intelligent system," "artificial intelligence," "bot" or "Bot," and "AI" mean a machine, system or technique that mimics human intelligence.

The phrase "machine learning" means a subset of AI that uses statistical techniques to enable machines to improve at tasks with experience.

The phrases "neural networks" and "neural nets" means an AI construction modeled after the way adaptable networks of neurons in the human brain are understood to work, rather than through rigid predetermined instructions.

The phrase "natural-language processing" means computer processing that occurs in speech-recognition technology in which software recognizes spoken sentences or phrases and recreate spoken language into text.

By way of providing additional background, context, and to further satisfy the written description requirements of 35 U.S.C. § 112, the following are incorporated by reference in entirety: U.S. Pat. Publ. Nos. 2020/0111377 to Truong et al; 2017/0344889 to Sengupta et al; 2019/0311374 to Dai et al; and 2014/0095501 to Niheu et al; U.S. Pat. No. 10,572,517 to Canim et al; U.S. Pat. No. 6,389,400 to Bushey et al; and U.S. Pat. No. 6,188,761 to Dickerman et al; and WIPO Appl. Nos. 2020/136680 to Sabharwal and 2019/034805 to Asghar.

SUMMARY

The present disclosure can provide several advantages depending on the particular aspect, embodiment, and/or configuration.

Generally, systems and methods to provide integrated orchestration of intelligent systems are disclosed, the systems and methods harvesting and combining aspects of disparate intelligent systems for use in intelligent virtual assistant applications.

The intelligent systems orchestration system of the disclosure provides, among other things, an intelligent integration, leveraging, and/or synergistic harvesting between cognitive plugins, CRM (customer relationship management) plugins, KMS (knowledge management system) plugins, Automation/RPA (robotic process automation) plugins, integration plugins, digital and analog communication channels, and multiple ACD (automatic call distributor) systems. Cognitive plugins include, but are not limited to, natural language processing (chatbots/IVAs, text translation, text analysis, text generation), sentiment analysis, speech recognition, text-to-speech, and computer vision. The intelligent systems orchestration system supports the building and deployment of cognitive applications (e.g., training, agent assist, customer assist, next best action and compliance) for enhancing a brand customer experience, and agent proficiency. The system also provides multi-IVA orchestration and supports session, context, and state management. Furthermore, the intelligent systems orchestration system includes a Conversation Control Language for the normalization of conversations across multiple channels and bots.

In one embodiment, an intelligent systems orchestration system is described, the system comprising: an orchestration system engine comprising a computer processor and a system database, the computer processor having machine-executable instructions operating to: receive, from a user, a first channel data stream of a first channel protocol; create a standardized protocol first channel data stream of a standardized protocol from the first channel data stream; receive, from the user, a second channel data stream of a second channel protocol; create a standardized protocol second channel data stream of the standardized protocol from the second channel data stream; provide the standardized protocol first channel data stream and the standardized protocol second channel data stream to a first NL (natural language) bot of a first cognitive service;

establish a first interactive communication session between the user and the first NL bot, the first interactive communication session associated with both of the standardized protocol first channel data stream and the standardized protocol second channel data stream; record first channel conversation topic data associated with the first interactive communication session; upon identification of a pause datum of the first interactive communication session, transfer the first channel conversation topic data to a second NL bot of a second cognitive service; and establish a second interactive communication session between the user and the second NL bot.

In one aspect, the first channel protocol is different than the second channel protocol. In another aspect, the first cognitive service has a different communication protocol than the second cognitive service. In another aspect, the first channel data stream is an analog voice channel and the second channel data stream is a digital data stream. In another aspect, the standardized protocol is JavaScript Object Notation. In another aspect, each of the standardized protocol first channel data stream and the standardized protocol second channel data stream are stored in the system database. In another aspect, the system database is an open source relational database. In another aspect, the first NL bot operates as a natural language bot and the second NL bot operates as a natural language bot. In another aspect, the machine-executable instructions further operate to: train both of the first NL bot and the second NL bot using both of the standardized protocol first channel data stream and the standardized protocol second channel data stream.

In another embodiment, an intelligent systems orchestration system is disclosed, the system comprising: an orchestration system engine comprising a computer processor and a system database, the computer processor having machine-executable instructions operating to: receive, from a user, a first channel data stream of a first channel protocol; create a standardized protocol first channel data stream of a standardized protocol from the first channel data stream; receive, from the user, a second channel data stream of a second channel protocol; create a standardized protocol second channel data stream of the standardized protocol from the second channel data stream; provide the standardized protocol first channel data stream and the standardized protocol second channel data stream to a first NL bot of a first cognitive service; establish a first interactive communication session between the user and the first NL bot, the first interactive communication session comprising the standardized protocol first channel data stream and the standardized protocol second channel data stream; train the first NL bot using data from the first interactive communication session; provide the standardized protocol first channel data stream and the standardized protocol second channel data stream to a second NL bot of a second cognitive service; and train the second NL bot using data from the first interactive communication session; wherein: the first channel protocol is different than the second channel protocol.

In one aspect, the first cognitive service has a different communication protocol than the second cognitive service. In another aspect, the first channel data stream is an analog voice channel and the second channel data stream is a digital data stream. In another aspect, the first NL bot operates as a natural language bot and the second NL bot operates as a natural language bot.

In another embodiment, a method of integrating multiple intelligent systems is described, the method comprising: providing an intelligent systems orchestration system comprising a user interface and an orchestration system engine, the orchestration engine comprising a system database and a computer processor having machine-executable instructions; receiving, by the user interface, a first channel data stream of a first channel protocol; receiving, by the user interface, a second channel data stream of a second channel protocol; providing the first channel data stream and the second channel data stream to the computer processor; performing machine-executable instructions by the computer processor to: create a standardized protocol first channel data stream of a standardized protocol from the first channel data stream; create a standardized protocol second channel data stream of the standardized protocol from the second channel data stream; provide the standardized protocol first channel data stream and the standardized protocol second channel data stream to a first NL bot of a first cognitive service; establish a first interactive communication session between the user and the first NL bot, the first interactive communication session associated with both of the standardized protocol first channel data stream and the standardized protocol second channel data stream; record first channel conversation topic data associated with the first interactive communication session; upon identification of a pause datum of the first interactive communication session, transfer the first channel conversation topic data to a second NL bot of a second cognitive service; establish a second interactive communication session between the user and the second NL bot.

In one aspect, the first channel protocol is different than the second channel protocol. In another aspect, the first cognitive service has a different communication protocol than the second cognitive service. In another aspect, the first channel data stream is an analog voice channel and the second channel data stream is a digital data stream. In another aspect, the first NL bot operates as a natural language bot and the second NL bot operates as a natural language bot. In another aspect, each of the standardized protocol first channel data stream and the standardized protocol second channel data stream are stored in the system database. In another aspect, the machine-executable instructions further operate to: train both of the first NL bot and the second NL bot using both of the standardized protocol first channel data stream and the standardized protocol second channel data stream.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of the system methods of use may also or alternatively be implemented partially in software and/or firmware, e.g., metrics and/or guidelines to alter the training scenarios or customer personas, etc. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 3 is an alternate schematic diagram of the intelligent systems orchestration system of

FIG. 2;

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The following disclosure generally relates to an intelligent system orchestration system that harvests and combines aspects of disparate intelligent systems for use in intelligent virtual assistant applications. The intelligent system orchestration system may be referred to as "orchestration system," the "system," the "digital worker factory," and/or the "DWF." Aspects of an intelligent system orchestration system will be described with respect to FIGS. 1-5.

Figure 1:
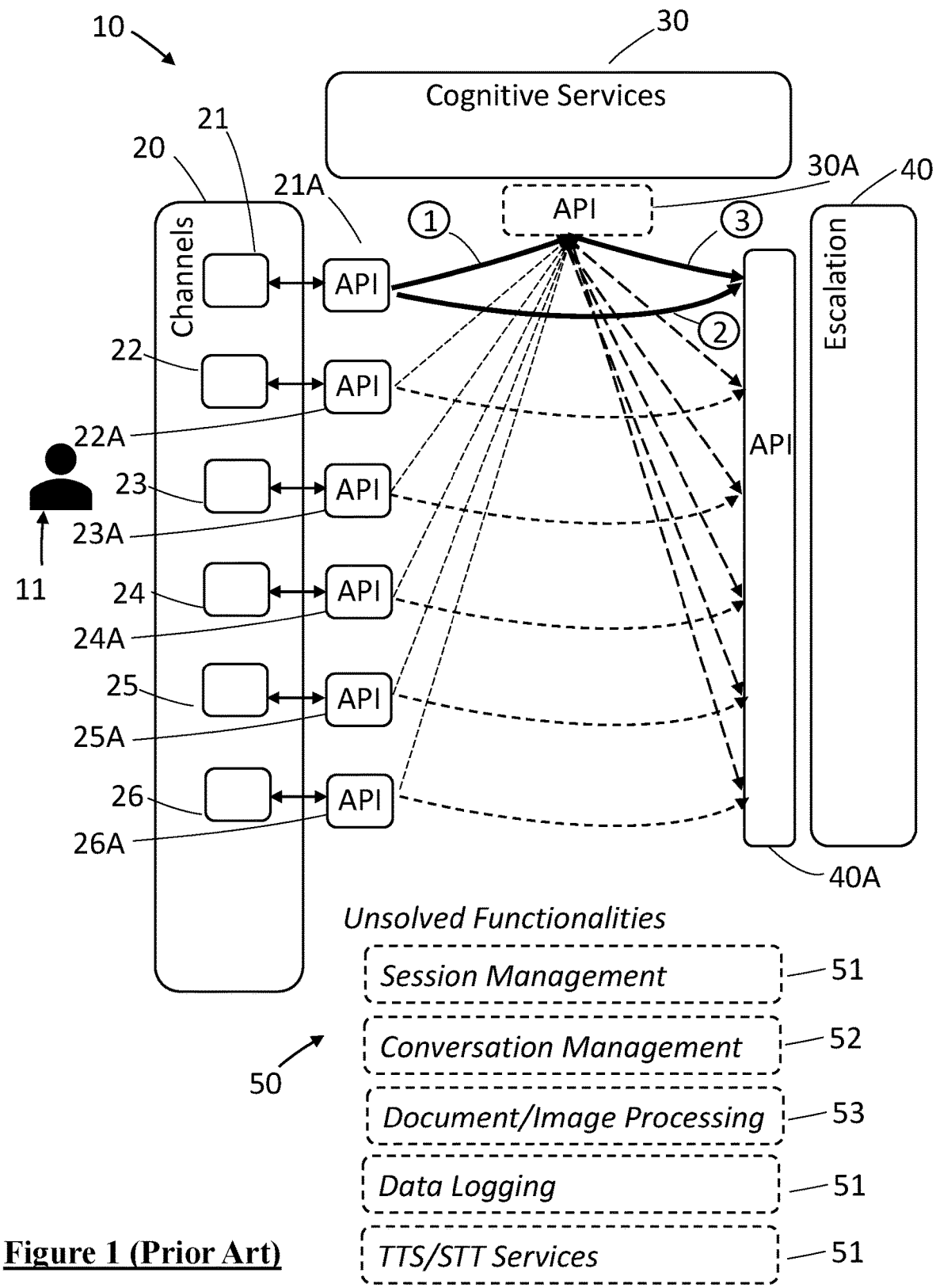
FIG. 1 is a schematic diagram of a conventional approach to handling multi-channel intelligent systems operations of the prior art.

FIG. 1 is a schematic diagram of a conventional system 10 of the prior art to handle multi-channel intelligent systems operations.

Each intelligent system has a set of specialized components unique to that particular system; such components enable functions such as programming, operation, and training of the intelligent system. Furthermore, existing intelligent systems have unique software interfaces requiring customized and time-consuming integration across other intelligent systems. When a set of intelligent systems providing cognitive services are implemented in an intelligent virtual assistant (IVA) environment, custom integrations between input channels, human agents, and the cognitive engines of the disparate intelligent systems are required. Such custom integrations are typically complex, requiring substantial effort in time and resources for implementation. Maintenance and upgrade to such integrations are also resource intensive and problematic, compromising overall system stability and reliability.

The conventional system 10 of the prior art requires specialized interfaces between each channel of the channel set 20, cognitive services 30, and any escalation party 40 involved. Cognitive services 30 may include intelligent virtual assistants (IVAs) and other AI-related components, as described below. The escalation party 40 or parties are humans and may include customer care agents, customer care supervisors, etc.

Two intelligent virtual assistant applications or use cases are of particular interest and will be discussed and considered in the disclosure: customer assistance and agent assistance. In customer assistance, a user 11 who is a customer of the system 10 seeks customer care through the system 10. For example, the customer may call or text the system 10 seeking assistance with a billing question. Such is the typical case when a customer phones a call center seeking assistance (e.g., to pay a bill to a phone company) or to take some action (e.g., to file an insurance claim). In agent assistance, a customer care agent is in need of assistance in handling or dealing with a customer. Such may be the case when the agent is working at a call center and encounters a customer who is belligerent or otherwise uncooperative with the agent.

The specialized interfaces typically involve or are specialized APIs, i.e., specialized Application Programming Interfaces for each channel of the channel set 20. A channel refers to a communication channel of a user 11. For example, a user 11 may engage the conventional system using a chat channel 21, which requires a specialized chat channel API 21A to engage or communicate with either the cognitive services 30 or escalation parties 40. Similarly, a user 11 may engage the conventional system 10 using an SMS channel 22 that requires an SMS channel API 22A, using a WhatsApp channel 23 requiring a WhatApp API 23A, using a Twitter channel 24 requiring a Twitter API 24A, and/or using a Facebook channel 25 requiring a Facebook channel API, and the like. Channel 26 is a voice channel, with associated specialized voice API 26A. Note that each of the specialized channel APIs typically require separate integrations for communication with cognitive services 30 as well as with escalation parties 40. Stated another way, typically two integrations are required for each communication channel type: one to interact with or communicate with cognitive services, and another to interact with or communicate with escalation agents 40. The interaction of any particular channel of the channel set 20 is by way of a cognitive services API 30A. Other channels of communication as known to those skilled in the art are possible.

The communication or integration between the cognitive services 30 and the cognitive services API 30A also requires a unique API that maps to the unique channel input. For example, chat channel 21 communicates through chat channel API 21A with cognitive services 30 and cognitive services 30A (identified as circled 1 in FIG. 1) and requires a specialized integration to in turn for the cognitive services 30 to communicate with escalation parties 40 through escalation parties API 40A (identified as circled 3 in FIG. 1). Also, a direct communication between chat channel 21, by way of chat channel API 21A, with escalation parties 40 and escalation party API 40A requires yet a third specialized integration (identified as circled 2 in FIG. 1). Therefore, each channel of the channel set 20 requires three specialized integrations. The requirement of three specialized integrations for each channel results in burdensome complexity and increased costs and time to implement and maintain.

Additionally, the conventional system leaves unsolved several beneficial functions that require commonality and/or unified integration of the channel sets 20 with the cognitive services 30 and escalation parties 40, to include session management 51, conversation management 52, document/image processing 53, data logging 54, and TTS/STT services 55.

In contrast, as described in the disclosure, the intelligent systems orchestration system of the disclosure efficiently and effectively integrates a set of disparate intelligent systems for use in intelligent virtual assistant applications. The disclosed intelligent systems orchestration system provides many benefits, such as the ability to mix and match, and combine, cognitive sources from disparate intelligent systems sources such that the overall system is agnostic to any particular intelligent system and associated specialized components.

Figure 2:
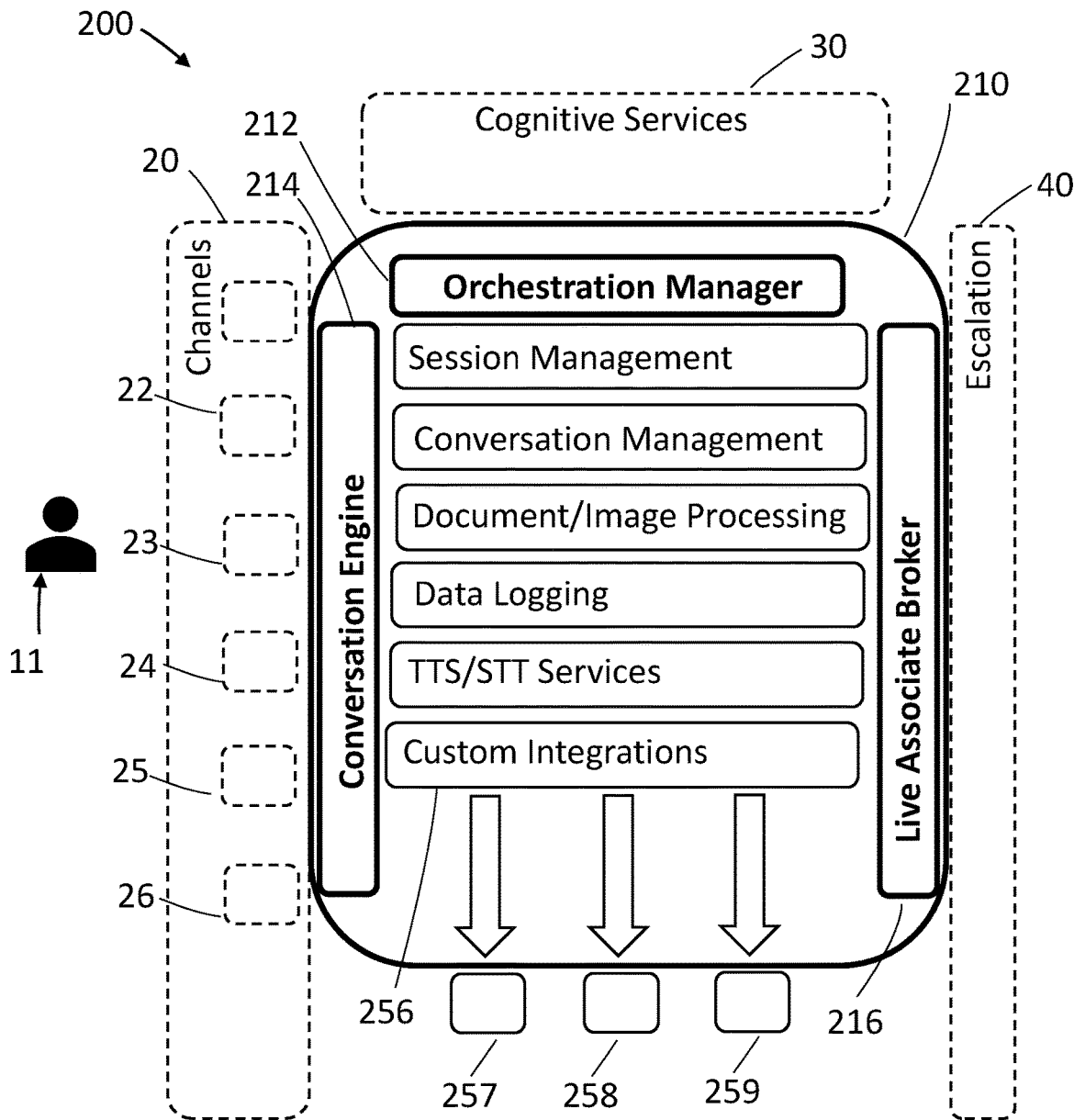
FIG. 2 is a schematic diagram of one embodiment of an intelligent systems orchestration system of the disclosure.

FIG. 2 is a schematic diagram of one embodiment of an intelligent systems orchestration system 200, represented in a similar manner to the convention system 10 of FIG. 1 to highlight differences. The intelligent systems orchestration system 200 may be referred to simply as system or system 200. The system 200 comprises an orchestration system engine 210. The orchestration system engine 210 comprises an orchestration manager 212, conversation engine 214, and live associate broker interface 216. The orchestration system engine 210 may include one or more of the functions or services or capabilities left unsolved in the conventional system 10, e.g., those of session management 51, conversation management 52, document/image processing 53, data logging 54, and TTS/STT (text to speech, speech to text) services 55. Also, the orchestration system engine 210 may provide custom integrations 256 and may output or produce system-wide or comprehensive reporting and/or monitoring, to include data analytics 257, performance monitoring 258, and data repositories 259.

The system 200 receives, through the conversation engine 214, one of more inputs from a user 11 by way of one or more channels 21-26. (Note that the channels of the channel set 20 comprise analog and digital communication channels).

Each of the orchestration manager 212, conversation engine 214, and live associate broker interface 216 are configured to avoid and not require the specialized APIs of the conventional system 10 to enable a unified and integrated interaction between the channel set 20, cognitive services 30, and escalation parties 40.

The conversation engine 214 receives one or more inputs from the one or more channels 21-26 of the channel set 20. The one or more channels may be analog and/or digital signals, and may include channels depicted in FIGS. 1-2 and those known to those skilled in the art. Generally, the channels of the channel set 20 include channels output from smart devices (e.g., SMS) and those from social media via a smart device (e.g., Twitter), and also voice or phone channels. The one or more channels have unique protocols or communication interfaces or communication requirements, which in the conventional system 10 require unique APIs to receive. In contrast, the conversation engine 214 is configured to receive the one or more channel inputs through a common interface such that the received channel set input data may be in turn be transferred or communicated to other areas or modules of the orchestration system engine 210, such as one or both of the orchestration manager 212 and the live associate broker interface 216. The conversation engine 214 receives the disparate channel set input data 311A from the one or more channels 21-26 of the channel set 20 and creates or outputs standardized channel set data 311B (See FIG. 3 as to elements 311A and 311B). Also, the standardized channel set data 311B may be used to drive or enable one or more of the functions left unsolved in the conventional system 10, e.g., those of session management 51, conversation management 52, document/image processing 53, data logging 54, and TTS/STT services 55, and also the custom integrations 256 which may output or produce system-wide or comprehensive reporting and/or monitoring, to include data analytics 257, performance monitoring 258, and data repositories 259.

The orchestration manager 212, among other things, provides a unified interface between the orchestration system engine 210 and one or more cognitive services 30. More specifically, the orchestration manager 212 enables a seamless interaction or communication between one or more channels 21-26 of the channel set 20 and one or more cognitive services. The orchestration manager 212 receives the channel set standardized data 311B, as created or generated or output from the conversation engine 214, and inputs or transfers that standardized channel set data 311B to one or more cognitive services 30 so as to provide an interaction, e.g., between a particular channel 21-26 provided by a user 11 and a particular cognitive service 30, such as an IVA of a particular cognitive service 30. The orchestration manager 212 may also interact or communicate with the one or more of the session management 51, conversation management 52, document/image processing 53, data logging 54, and TTS/STT services 55, and also the custom integrations 256 elements. Furthermore, the orchestration manager 212, as required, may communicate or interact with the live associate broker interface 216. For example, if a particular interaction between a user 11 via a particular channel 21-26 of the channel set 20, as enabled by passing of standardized channel set data 311B to the orchestration manager 212 to drive an interaction with a particular cognitive service 30 such as a first IVA requires escalation (meaning, e.g., the user 11 seeks engagement with a human given unsatisfying interaction with the particular IVA), the orchestration manager 212 provides escalation standardized data to the live associate broker interface 216. Such escalation standardized data may include transcripts of the interaction or communication between the user 11 and the particular IVA.

More generally, the orchestration manager 212 may escalate and handoff the channel conversation to a live agent if the bot is unable to assist, or if the customer requests to speak to a live agent. In event of escalation, the chat transcript and any other key-value-pair values are handed off to the escalation platform so it can be delivered to the live agent.

The live associate broker interface 216 receives one or more of the standardized channel set data 311B and the escalation standardized data to provide or enable an interface to one or more escalation parties, such as a customer care agent or a supervisor.

The system 200, through the orchestration manager 212, conversation engine 214, and/or live associate broker interface 216 of the orchestration system engine 210, supports use cases or applications such as Associate Assist and Customer Assist, as described below. Furthermore, the orchestration system engine 210 enables third party cognitive services integrations (aka with the cognitive services element 30) to include those of NLP (natural language processing), NLU (natural language understanding), STT, TTS, AI Services, RPA/RDA (robotic process automation, robotic desktop automation. Also enabled by the orchestration system engine 210 is a unified and single source for reporting and monitoring of user 11 interaction with the system 200 and all interactions with one or more cognitive services 30 (e.g., one or more IVAs of one or more cognitive services 30 applications) and/or one or more escalations with escalation element 40. Such recordings, reporting, and/or monitoring data may include all state conditions of the cognitive services and/or escalation (state meaning characteristics of the entity, e.g., for an escalation, the name of the escalation agent, training level or experience of the particular escalation agent, etc.) and/or state conditions of the user 11 (e.g., frequency of calls or interactions with the system 20, particulars of the issue(s) the user 11 is addressing through the system 200, etc.).

Figure 3:
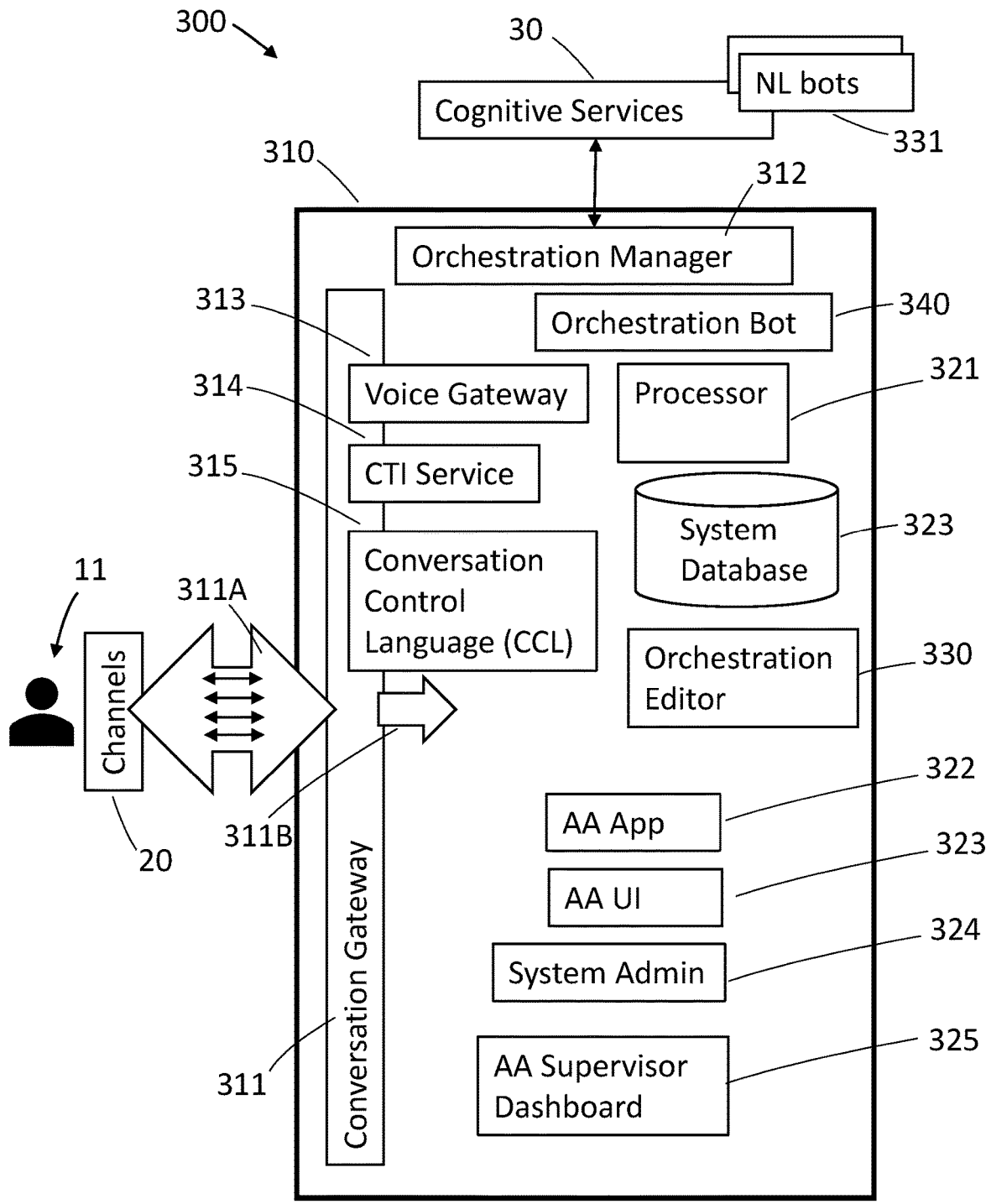

FIG. 3 is an alternate schematic diagram of the intelligent systems orchestration system 300 of FIG. 2. The intelligent systems orchestration system 300 may be referred to as system 300.

The intelligent systems orchestration system 300 interacts with user 11 and cognitive services 30 and may be configured for one or more particular applications or use cases, such as a customer assist application and an agent assist application. (See, e.g., U.S. Pat. Publ. Nos. 2020/0111377 to Truong et al as referenced above for a description of customer service operations and roles/responsibilities of parties involved).

The intelligent systems orchestration system 300 comprises orchestration system engine 310, which in turn comprises orchestration manager 312. The orchestration manager 312 receives disparate channel set input data 311A from the one or more channels 21-26 of the channel set 20 and creates or outputs channel set standardized data 311B, as briefly described above with respect to FIG. 2. The disparate channel set input data 311A is created through input from user 11.

The orchestration manager 312, aka the "orchestrator," is responsible for being embedded into the conversation (e.g., via a voice channel 26, messaging channel such as chat channel 21) with a user 11 so that a digital worker bot 340 and/or one or more NL (natural language) bots 331 are enabled to assist either the user 11 (the user 11 may be, e.g., a customer in the customer assist use case and an agent in the associate assist uses cases). The orchestrator provides a canvas of nodes that can be combined to build a unique bot experience for each customer. In these flows one can combine one or more NLU bots of choice into the conversation (e.g., DialogFlow, Watson Assistant, Rulai, NLU/Sentiment, etc.), or other nodes that support knowledge or actions such as RPA, KMS systems, and CRM.

The cognitive service 30 element comprises one or more NL bots 331 and may comprise a set of NL bots 31, such as a first NL bot and a second NL bot. Each of the set of bots may be capable of interaction with a user 11 to create a set of conversation topics and to conduct a conversation with a user. For example, a first NL bot may conduct a first NL bot conversation comprising one or more topics, e.g., comprising a first NL bot first conversation topic, a first NL bot second conversation topic, and the like. Any given point during a first NL bot conversation may be termed a first NL bot conversation datum. Similarly, a second NL bot may conduct a second NL bot conversation with a second NL bot comprising one or more topics, e.g., comprising a second NL bot first conversation topic, a second NL bot second conversation topic, and the like. Any given point during a second NL bot conversation may be termed a second NL bot conversation datum.

For each user conversation (by way of one or more channels 20, e.g., voice, messaging, etc.), the orchestration manager 312 creates a unique session identifier and maintains (in memory of processor 321, in system database 323, e.g.) the state or status of important activities during the conversation. For example, the orchestration manager 312 maintains or tracks or stores the status (e.g., a conversation datum) and/or the context (e.g., the conversation topic) of each individual NL bot 331 throughout conversation.

The state may provide details of or describe the datum or location of the conversation between the user 11 and the NL bot 331 (e.g., user has asked a question of the NL bot 331). The context may include the conversation topic under discussion (e.g., a recurring billing problem, a problem accessing a customer care web site). Thus, the orchestration manager 312 maintains and tracks where the user 11 is in a particular dialog with one or more NL bots 331 such that, among other things, a particular NL bot 331 is able to return, or remember, the location (datum) and context of a particular user conversation if and when the user 11 is re-engaged after a pause or other interruption in the conversation.

Stated another way, the orchestration manager 312 creates one or more NL bot identifiers associated with the one or more NL bots 331, such as a first NL bot identifier and a second NL bot identifier. The first NL bot may conduct a first NL bot conversation with a user 11 that generates a first NL bot conversation data stream, the first NL bot conversation data stream comprising one or more conversation topics. The first NL bot conversation data stream may comprise one or more conversation datums, such as a start datum, first pause datum, second pause datum, and end datum. Similarly, a second NL bot may conduct a second NL bot conversation with a user 11 that generates a second NL bot conversation data stream, the second NL bot conversation data stream comprising one or more conversation topics. The second NL bot conversation data stream may comprise one or more conversation datums, such as a start datum, first pause datum, second pause datum, and end datum. The orchestration manager 312 maintains and/or stores these data, e.g., the orchestration manager 312 identifies, maintains, and/or stores the data and data streams of each of the NL bots 331 of the set of NL bots 331, to include, e.g., the first NL bot conversation data stream and the second NL bot conversation data stream.

The orchestration manager 312 may orchestrate or share or manage interaction of the set of NL bots 331 with the user 11. For example, the orchestration manager 312 may share context between NL bots 331 so as to allow a secondary bot to take over where the first NL bot left off. Stated another way, the orchestration manager 312 may note or identify or be triggered by a first pause datum of a first NL bot conversation data stream, causing the orchestration manager 312 to engage a second NL bot to engage with the user 11 as a substitute for the first NL bot. The orchestration manager 312 shares or provides data generated from the first NL bot conversation with the user (up to the identified first NL bot datum) with the second bot (such data may include all or part of the first NL bot conversation data stream, e.g., conversation topics).

The orchestration manager 312 may record or publish, using processor 321 and/or system database 323, any or all of the data associated with user 11 interactions with the one or more NL bots 331. For example, these data may be used to generate the data analytics 157, performance monitoring 159, and/or data repositories 159 described above. The orchestration manager 312 may create separate conversation sessions associated with the conversation parities or character of the conversation. For example, the orchestration manager 312 may create and/or record a first conversation session between a user 11 and a first NL bot and create and/or record a second conversation session upon the addition of a second NL bot to the first conversation session.

In one embodiment, more than one NL bot 331 is engaged with a user 11 at a time. Note that the set of NL bots 331 may be any cognitive service application or component, to include natural language bots. In one embodiment, one or more of the set of NL bots 331 are natural language bots or callable of natural language bot functions, as known to those skilled in the art. In one embodiment, the orchestration bot is a natural language bot or callable of natural language bot functions, as known to those skilled in the art.

The orchestration manager 312 may comprise an orchestrator bot 340 which may operate to embed with the one or more NL bots 331 into a particular conversation with a user 11. For example, the orchestrator bot 340 may embed into a user 11 conversation at the beginning of a conversation (e.g., start of web chat), or may be brought into the conversation at the middle of conversation (e.g., when call arrives to an agent). Either way, a new session may be created by the orchestration manager 312 as triggered by the entry of the orchestrator bot 340. As such, the orchestration manager 312 may mix and match a set of selectable NL bots 331 to create a unique and tuned conversation session with a user 11.

The orchestration manager 312 also comprises the Conversation Control Language (CCL) 315 module. CCL 315 defines how conversation is normalized across bots to include NL bots 331 and orchestration bot 340, channels 20 and various message types such as text, cards, rich media, etc. Customers (aka user 11) may be interacting on different channels 20, e.g., voice, social, SMS, web chat, etc. In a conventional system 10, typically each channel 20 has limits on the type of messaging that is supported. For example, one cannot share carousel card on SMS, or one cannot present buttons on a voice conversation.

CCL 315 provides a normalization or standardization such that regardless of channel 20 or bot one is integrating, one is speaking one unified or standardized language. Such a normalization part of the Orchestrator 310 allows one to have an abstract language that works across many bot vendors and channels. Stated another way, the CCL 315 enables the orchestration manager 312 to receive disparate channel set input data 311A from the one or more channels 21-26 of the channel set 20 and create or output channel set standardized data 311B. For example, the orchestration manager 312, by way of the CCL 315, may receive a first channel data stream of a first channel protocol and create a standardized protocol first channel data stream of a standardized protocol from the first channel data stream. Similarly, the orchestration manager 312, by way of the CCL 315, may receive a second channel data stream of a second channel protocol and create a standardized protocol second channel data stream of a standardized protocol from the second channel data stream. The first channel protocol may be different than the second channel protocol.

The Conversation Control Language 315 defines a set of open standard file format and data interchange formats. In one embodiment, the CCL 315 defines a set of JSON structured control responses that are returned from synchronous Bot/AI dialogue nodes invocations. (JSON means JavaScript Object Notation). Authors of AI conversations may leverage these control responses to enhance the conversation flow beyond simple text messaging between the end user and a Bot. A set of common control responses are defined that will be supported by all of the end user channels, additionally there will be channel specific response messages defined so that conversation authors can take advantage of channel specific features (Facebook, Slack, etc . . . )

The top level "response" node in the structure is required. Below the response node may be one or more channel specific sections. These sections may include 'common' as well as other channel types such as 'mobile', 'facebook', 'slack', etc. Channel sections will contain an array of response type maps. If multiple response type maps are present, they will represent an ordered sequence and each type of map will be translated and sent to the channel client in order. The following is an example response that a contains a text message as well as an inline image to be sent to the channel client.

Example or common response types handled by the CCL include: text, file, pause, action, option, channel escalation. Each response type has a defined structure.

A text response types may mean a text message to the channel client. FIXME: The text may contain Markdown (https://en.wikipedia.org/wiki/Markdown) encoding that will be translated to channel specific support. A file response type may mean an indication to the channel client that a file is available for download. A pause response type may mean a time in milliseconds to pause before sending the next response type. An action response type may mean a display of a button a channel user can click to take an action. The specified value attribute of the options is then sent as the user response.

An option response type may mean a display of a set of buttons a channel user can click to choose an option. The specified value attribute of the options is then sent as the user response A channel escalation response option may mean providing a list of available channel escalation options to a channel client. Based on the user selection the 'value' data section for the escalation should be sent back by the channel client.

The orchestration manager 312 supports or is configured to operate with each of voice channel 26 and chat channel 21 inputs and may be tuned or configured to operate with Associate Assist use cases. Voice channel 26 may be based on telephony hardware and CTI integration which may require two services within the system 300.

CTI Service 313 enables the orchestration manager 312 to understand about call events, when a call has arrived at an agent, if the call is on hold, transferred, or if call has ended, for example. Such events help orchestration manager 312 maintain unique session and to know when to bring in a particular NL bot 331 bot or remove a particular NL bot 331 a user 11 conversation.

Voice Gateway 312 provides real-time voice to text transcription. Combined with CTI service 313, the orchestration manager 312 is able to know of call events and what is being spoken in the conversation (between a user 11 and one or more NL bots 331). The individual utterance from caller and agent data is used to process natural language understanding, which typically can result into a suggestion to the agent.

Using above CTI events and text transcript of real-time voice, the orchestration manager 312 engages a particular NL bot 33 1and is able to offer various cards/recommendations to the agent. The real-time CTI events and recommendations derived from transcribed utterances are then published by the orchestration manager 312 through message queue and downstream to a particular application or use case, such as the Associate Assist application.

The orchestration manager 312 supports IVA (Customer Assist) for all channels as defined by Conversation Gateway 311 channel support. In addition, orchestration manager 312 also offers REST API to directly invoke Orchestrator flow which may contain NLU bot(s). This is especially useful when one seeks to take voice conversation and seeks a way to introduce the orchestration manager 312 as a bot into the conversation (meaning introduce the orchestration bot 340).

The Customer Assist use case typically means that orchestration bot 340 has been introduced into the conversation from the beginning when the customer-initiated conversation on the channel. The self-service experience can be customized with one or more NLU bot or nodes that are available in the canvas. The canvas also includes escalation nodes which provide escalation to various flavors of ACD platforms (e.g., Cisco UpstreamWorks, Cisco ECE, etc.). This is helpful when a particular NL bot 331 determines it is no longer able to assist the customer and the conversation needs to be transferred to a live human agent. The orchestration bot 340 is able to understand when a NL bot 331 detects escalation intent (using CCL) and is able to escalate the conversation to a live agent. Since orchestration bot 340 is in middle of the conversation, one is easily able to shift conversation between customer and bot, to customer and live-agent. As the orchestration bot 340 is embedded into the conversation, a customer assist use case can then shift over to associate assist use case where we start making recommendations to the agent as the system 300 listens or monitors the chat conversation.

The conversation gateway 311 allows the system 300 to front conversation channels (any of channels 20) where customers (aka a user 11) will begin their conversation journey. Conversation gateway 311 helps deploy these channels, customize the channel behavior, and normalize conversations into the CCL 315.

The communication channels 20 may include Web Chat 21, SMS 22 (via Twilio), and Facebook Messenger. Such channel clients are universal because with the system 300 one is able to customize bot and escalation experience regardless of channel 20. For example, one may decide to deploy web chat for a customer that integrates with two bots 331 and later escalates to Cisco UpstreamWorks. For another customer, one could deploy a single bot 331 that escalates to Cisco ECE. Regardless of bot or escalation, the client is the same and is customizable.

The communication gateway (CG) 311 also helps establish a session with the Orchestrator 312 and relay's messages back and forth between customer and bot or agent. CG 311 may take a user's 11 input and raw message from a particular channel 20 and transform it such that it may be sent to the orchestrator manager 312. In response, from the orchestrator manager 312, one may receive a CCL 315 message which the CG 311 interprets according to the channel and how the channel supports the message types.

In addition to standard text-based messaging, CG 311 is also able to interpret non-message based events such as typing indicators, browser events, agent activity events. All of these events are appropriately routed to the channel client or to Orchestrator so they can reach the live agent.

CTI service 313 is responsible for connecting to ACD platform and subscribing for call CTI events of various call activities. The call events are received, transformed and forwarded to the Orchestrator service so that the Orchestrator 312 may maintain its own session state of active calls. The Orchestrator may use these call events (e.g., Cisco CallEstablished and CallCleared) to understand when the call has arrived at an agent, or if call has terminated. These events give the orchestrator manager 312 the signal to bring in the bot to assist the agent and terminate the session/bot when call has ended. Orchestrator also uses these events to notify the agent using Associate Assist UI that a call has arrived or ended.

The voice gateway 313 is responsible for receiving SIP/RTP forked media stream coming from the SBC and transcribing both customer and agent RTP audio via Speech-To-Text engine. (In one embodiment, the voice gateway 313 is the IBM Voice Gateway product). The RTP to text transcription is done in real-time, per individual party in the conversation. The Voice Gateway integrates with third party speech to text services such as (Google STT or IBM STT) to handle the transcription. The resulting real-time transcription text is then delivered to the orchestration manager 312 where the orchestration manager 312 is able to associate caller's session via CTI service to piece together call events along with utterances.

The system database 323 stores all conversation sessions that are processed through the system 300. The system database 323 is responsible for logging all requests, orchestrator canvas nodes that were invoked and their outcome as the bot responded by back to user. These data are valuable for historical reporting, real-time dashboards, and NLU based data analysis that occurs in real-time. The data are also available to drive or enable one or more of data analytics 157 and performance monitoring 158.

In one embodiment, the system database 323 is any commercially available relational database, to include free any open-source relational database systems known to those skilled in the art, such as the Postgre SQL aka Postgres database system.

The system database 323 may include one or more of the following tables: device, session, session history, and orchestrator.

The device table of the system database captures a customer's device and channel in which they are interacting from. For inbound voice call one expects to observe customer ANI (unique phone number) or for web chat a unique identifier and optionally customers account number. With data related to each user, one is able to understand returning users or new users.

The session table of the system database captures each individual session created on the Orchestrator. Every conversation has a unique session identifier where one may keep track of length of conversation, status of the session, how conversation arrived, or how the conversation resolved, for example.

The session history table of the system database captures individual events that occurs on the Orchestrator. For AA voice, this could be when call arrived to agent, followed by individual transcribed utterance between customer and agent, then followed by call end event when the call terminated. Each session identifier or identification typically has many entries to capture the conversation events.

The orchestrator table of the system database captures how the Orchestrator processed each utterance/message from the customer or agent. Here one may observe how a particular message was processed through Orchestrator flow and nodes that were executed in the canvas.

The associate assist (AA) app 322 is backend application that proxies messaging between Orchestrator and AA UI 323. It also helps support authentication of users logging into any of the UI based applications.

The AA app 322 (developed using GraphQL technology) allows one to publish only relevant information down to the UI. On startup, AA app subscribes to message queue and waits for events to arrive as they are published from Orchestrator. Any of the Orchestrator events (call events, suggested card events, transcript event), are all picked up from the message queue and AA app delivers it downstream to UI using GraphQL. For all users accessing AA UI (user interface) 323, one is first authenticated through AA app 322. Once authorized, the application is able to communicate back and forth to receive events and call APIs.

The Associate Assist UI 323 comprises Associate Assist UI (the interface used by contact center agents to receive recommended answers and other cards), Supervisor Dashboard (the interface used by contact center supervisor to monitor all agents and their interactions in real-time), and Admin (the interface used by cognitive developers, business analysts to configure and train the bot).

Both AA UI and Supervisor Dashboard primarily run in "listening mode" in that the application subscribes and waits to receive events. These events can be form of call activities (Call arrived to agent, call ended, etc.), transcript (live utterances as they are transcribed), or form of suggested cards (cards presented to the agent based on processing of utterance, typically with NLU bot).

The orchestration editor 330 is a drag-and-drop interface which allows cognitive developer to customize AI bot experience. In the orchestration editor 330 a canvas is provided which is grouped into following categories: Cognitive (AI cognitive integration nodes, e.g., Google DialogFlow, Rulai, etc.). Watson AI (Watson AI services integrations nodes, e.g. Watson Assistant, Discovery, etc.), Channel In (various ways interactions such as voice and chat can enter Orchestrator), Channel Out (Various ways interaction data can be sent out to UI and services), Processing (Nodes which assist in processing data as we orchestrate interactions), services (nodes which provide external integrations, typically non-AI related such as CRM, KMS, etc.), and subflows (provide re-usable flows that can be used across various interaction scenarios). The following nodes provide a developer with deeper level coding support to meet client's requirements: Input, Output, Function, Advanced, Storage, and Social. In one embodiment, the orchestration editor 330 provides assistance in managing orchestration manager 312, e.g., the orchestration editor 330 may manage and/or handle the flow of NLU bots, cognitive services, and/or automation.

With attention to the associate assist application or use case, "cards" may be employed which serve to assist the user 11 agent. A card may be presented via a UI top an agent. A particular card may be generated by one or more NL bots 331 and/or the orchestration bot 312. The cards may be of any of several types, to include a suggested answer card, a next best action card, a real-time script card, and an interaction summary card.

A suggested answer card provides a recommended answer based on a customer's (user 11) intent determined by a NL bot 331 or by an FAQ (frequently asked questions) knowledge source. The suggested answers may also contain relevant knowledge article links.

A next best action card provides a recommendation on actions such as the transfer the interaction (e.g., to another NL bot or to a human agent via escalation) or may recommend an RDA bot accessed via a desktop action on a user interface.

A real-time script card may provide a checklist of items that an agent must ask the caller (user 11) for compliance/adherence requirements. As the agent speaks to the system 300, the system 300 listens to and identifies the agent's intent and checks off the list in real-time. When the checklist is completed, the card is moved to completed state.

An interaction summary card provides a summary of the entire conversation after the conversation has ended. The following elements may be provided as a part of the interaction summary card: matched intents (all customers intents that were matched during the call), keywords (important keywords spoken by the customer), sentiment (overall sentiment of the conversation) and transcript summary (the transcript is summarized using machine learning to reduce overall transcript reading length down to 25-30%).

The orchestration manager 312 with regards to the AA use case may also provide these features: real-time transcripts, knowledge search, and context pills. Real-time transcripts provide a transcription of the voice conversation between a customer and an agent. The transcript may be copied and placed into external systems such as the CRM. A knowledge search allows an agent to ask a bot a question via a search input. In such a query one may surface relevant suggested answers or matching articles. A context pills provides important context information picked up or identified by the associate assist which is presented to the agent.

Other functions include a System Administrator 324 which provides a response builder and a speech to text tool (aka a call simulator). The response builder is a centralized managed bot response so that a business analyst can quickly update a suggested answer, without requiring knowledge of cognitive bots or having access to them. The speech to text tool is used to simulate a live call between a customer and an agent through a web browser. The System Administrator 324 manages and provides all administration functions of system configurations or use application, to include customer assist and associate (aka agent) assist.

A Supervisor Dashboard 325 aids the supervisor with a live view of the contact center on the live topics being discussed by the agents and caller. The supervisor has the ability to view following for each agent items including: a live transcript (customer and agent utterance as it is spoken), topis (customers' intent(s) as bot detects them using NLU), and sentiment (the live sentiment of the customer).

With attention to the customer assist application or use case, the orchestration manager 312 may also support both of SMS and web chat, and provide web chat client customizations, i.e., web chat client that is fully customizable in look and feel. In one embodiment, SMS and/or web chat customizations are handled by System Administrator 324. Examples of some elements that may be customized are: floating Chat Icon/Bubble (image, location, width, pop-up, etc.), chat header (icon, title, background, font), chat window (chat window—height, width, location, shadow, radius, color, width, font), chat panel (font, bot bubble font/color, user bubble font/color, agent bubble font/color, system bubble font/color, send Icon, Background color, placeholder options), greeting text, delay, show/hide, and send button (background color, font, border, hover).

Figure 4:
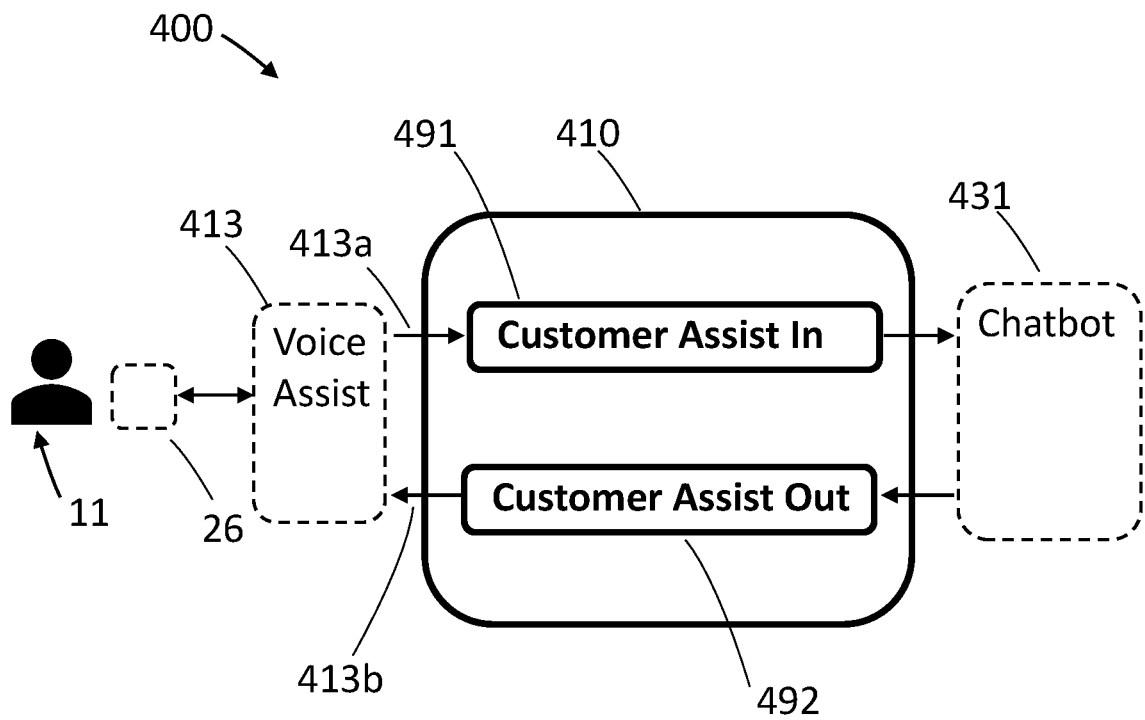
FIG. 4 is a schematic diagram of particular implementation aspects of the intelligent systems orchestration system of FIG. 2, as implemented for a customer assist application.

FIG. 4 is a schematic diagram of particular implementation aspects of the intelligent systems orchestration system of FIG. 2, as implemented for a customer assist application. The intelligent systems orchestration system 400 of FIG. 4 may be referred to as system 400. The system 400 comprises a voice assist 413 component which interacts with voice input from voice channel 26, as provided by user 11, a customer assist in 491 module, and a customer assist out 492 module. Each of customer assist in 491 module and customer assist out 492 modules interact with chatbot 431. Voice channel 26 is one of a channel set 20, as described in FIGS. 1 and 2 above. Voice assist 413 receives voice channel output from channel 26 and sends or outputs to voice channel 26. Voice assist 413, after processing of input data stream from voice channel 26, sends data stream 413A to the customer assist in 491 module. The voice assist 413 module receives a data stream 413B from the customer assist out 492 module. Generally, a customer user 11 calls into the system 400, and interacts with chatbot 431 by way of the system components 400, to include voice assist 413 module.

Note that the Customer Assist application or user case is a way to empower customers to self-service without having to speak to a live-human agent. This is very powerful because these assistants (chat bots) may be available 24/7 and provide seamless support experience. In an event the assistant bot is unable to service the customer, there is ability for the bot to escalate the interaction to a live-human agent.

Any of the disclosed intelligent systems orchestration systems, to include system 400, may integrate with or leverage a set or plurality of channels 20 and/or cognitive services 30. In one embodiment, the voice assist 413 module is provided by Cisco. In one embodiment, the chatbot 431 is a product by Rulai or any other enterprise conversational computing platform known to those skilled in the art.

Voice assist 413 handles all voice components (e.g., Speech-to-text and Text-to-speech) and interacts with the orchestration system engine 410 through each of the customer assist in 491 module and customer assist out 492 modules. Voice assist 413 handles all inbound voice channels, including CTI, routing and also converting customers spoken speech into text (in one embodiment, using Google's speech to text). Once speech is converted into text, Voice assist 413 interacts directly with the orchestration system engine 410 using REST API calls. (REST means representational state transfer architectural style; other API styles or protocols may be used, as known to those skilled in the art). The data stream or interaction from voice assist 413 and customer assist in data stream 413A. The orchestration system engine 410 is responsible for making the AI decisions such as invoking the chatbot 431. The response from the orchestration system engine 410, such as from the chatbot 431, is returned back to the voice assist 413 in data stream 413b. The voice assist 413 then in turn will take the data stream 413b data and either speak back to the customer 11 using text to speech or perform an action instructed by the chatbot 431 such as escalating or ending the call.

As identified above, the orchestration system engine 410 comprises the customer assist in 410 module (aka the customer assist node 410) which exposes REST API endpoints that may be invoked by voice assist 413. The customer assist module 410 or node new node is responsible for creating and setting up a new session on or via the orchestration system engine 410 (including session in-memory details, database table build-out's). The customer assist module 410 is responsible for processing inbound utterances (spoken words by the customer 11) and sending these down the orchestration system engine 410 flow so that these data may be processed by chatbot 431. The outcome of the chatbot 431 is sent to voice assist 413 as an HTTP response.

The data stream 413a provided by the voice assist 413 and received by the customer assist in 410 may include: create session, send message, and end session packets or instructions.

Upon receipt by customer assist in 491 of data stream 413a (e.g., customer utterances aka messages) from the voice assist 413, the customer assist in 491 passes data associated with the data stream 413a to the chatbot 431, which triggers the chatbot 431 to respond and/or take some action.

In reference to an incoming "send message" instruction or packet in data stream 413a, the result taken by the system 400 may include an output type, a context type, and an action type.

An output type is used by the voice assist 413 to determine how the chatbot 413 should respond to customer 11. Similar to Associate Assist, the conversation control language module described above is employed, which defines an array of instructions coming from the chatbot 431. For example, the chatbot 431 could instruction the voice assist 413 to speak some text. In a more complex example, the chatbot 413 may instruct the voice assist 413 to speak some text, followed by pause for 2 seconds, then followed by another text which needs to be spoken. The CCL object may be defined in the chatbot 431 and passed on as utterances that require instructions. The orchestration engine 410 is responsible for ensuring that response (an HTTP response) contains CCL under output object.

A context type helps the chatbot 431 remember what's occurred in the conversation. This context may be set by either the voice assist 413 or the chatbot 431 and it helps the chatbot 431 to make decisions or to derive appropriate dialog/response. The context type is basically passed around and managed by either parties (the chatbot 413 and the voice assist 413). The orchestration engine 410 is responsible to ensure that the context is cached into Orchestrator Redis and passed back to the voice assist 413 as an HTTP response.

The action type helps the orchestration engine 410 give instructions to voice assist 413 that are typically non conversational. For example, the chatbot 431 may determine it is no longer able to assist to customer 11 and needs to escalate the conversation to a human agent. In this case the chatbot 431 will define an escalate action that instructs voice assist 413 to escalate the call. Another case may be where both customer 11 and the chatbot 431 have completed all tasks and the call must be terminated. In this case, the chatbot 413 instructs the voice assist 413 to hang-up the call (hand-up is the action or instruction). Such instructions are output or generated by the chatbot 431. The orchestration engine 410 has responsibility to ensure all such action types are set and forwarded or directed from the chatbot 431 and back to the voice assist 413 via an HTTP response.

The customer assist in 491 module or node exposes API endpoints and processes the API endpoints to establish a session on or by way of the orchestration system engine 410, and also logs or records the inbound events. Also, the customer assist in 491 module or node internally exposes endpoints.

The chatbot 431 or chatbot node may support either or both of Associate Assist and Customer Assist use cases. For Customer Assist use cases, chatbot 431 handles processing outputs from a Customer Assist node and calls the chatbot 431 based on customer assist event type. The request/response from chatbot 431 are transformed to adhere to Customer Assist API and CCL guidelines. The customer assist out 492 module or node sends HTTP response back to voice assist 413. The orchestration engine 410 defines a set of REST APIs that may be invoked by voice assist 413.

Figure 5A:
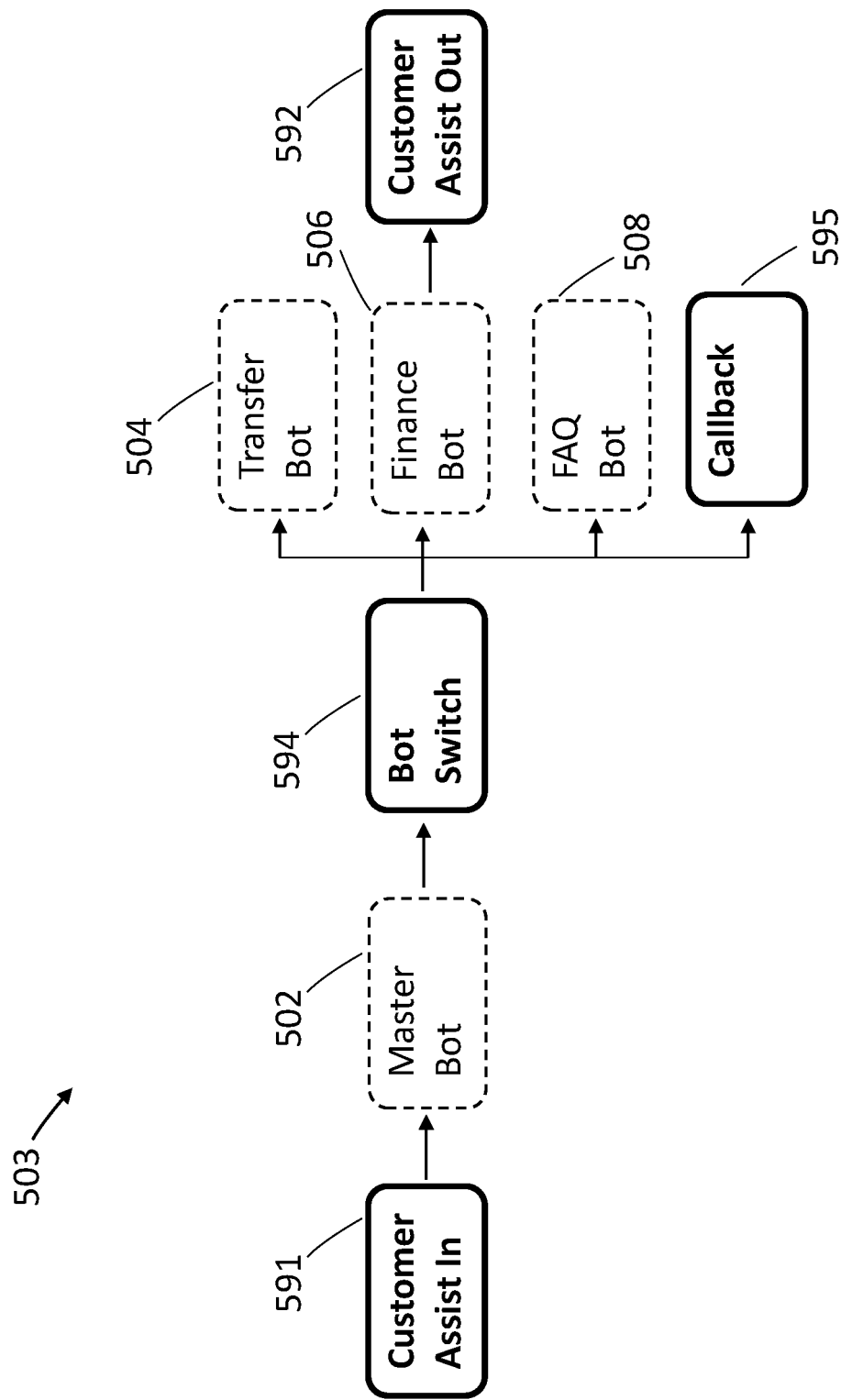
FIG. 5A is a schematic diagram a router pattern implementation of the intelligent systems orchestration system of FIG. 2, as implemented for a customer assist application.
Figure 5B:
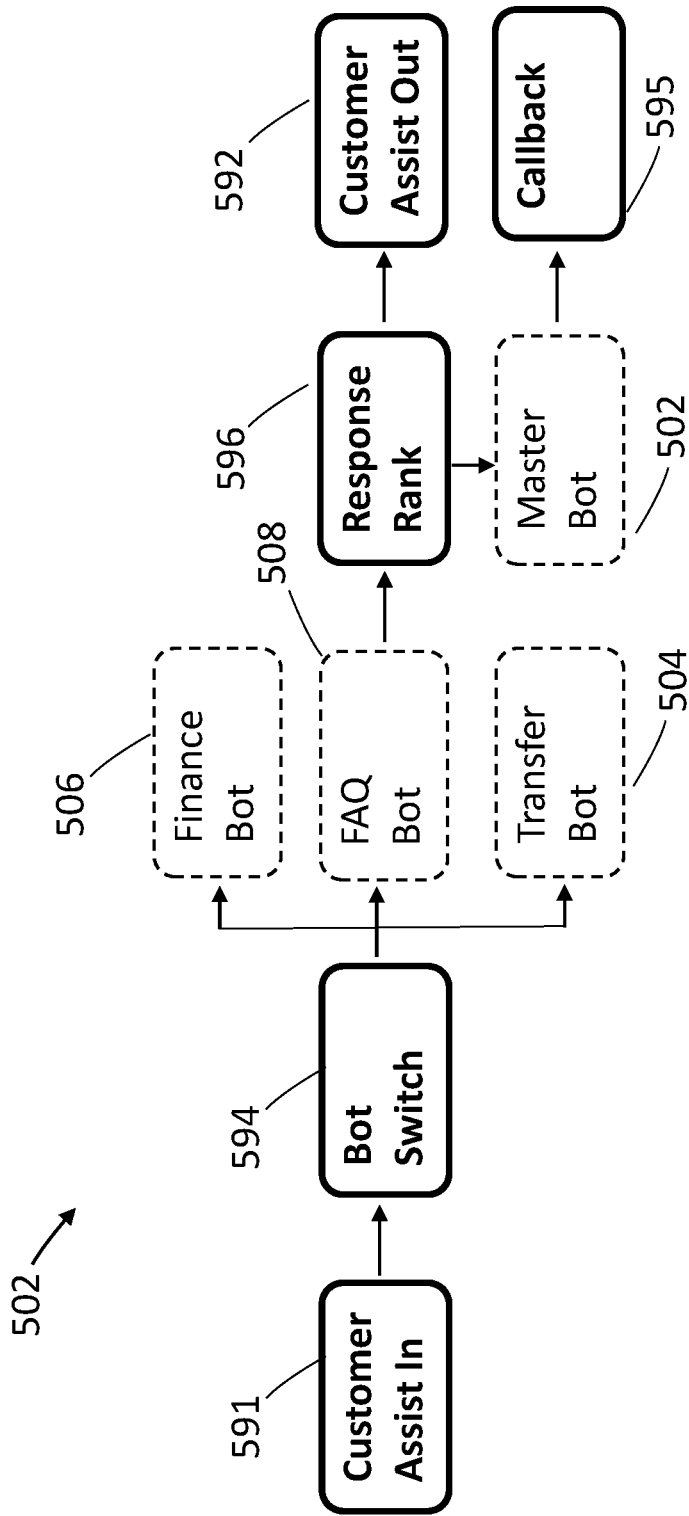
FIG. 5B is a schematic diagram a sprinkler pattern implementation of the intelligent systems orchestration system of FIG. 2.

FIGS. 5A-B each present two embodiments of implementation aspects of the intelligent systems orchestration system of FIG. 2 for a customer assist application. The intelligent systems orchestration system 501 of FIG. 5A uses a router pattern implementation and may be referred to as system 5A. The intelligent systems orchestration system 502 of FIG. 5B uses a sprinkler pattern implementation and may be referred to as system 5B.

In system 501 of FIG. 5A, a customer assist in 591 module, similar in operation and features to that of the customer assist in 491 module of FIG. 4, outputs to a master bot 502. In one embodiment, the master bot is Watson Assistant. The master bot 502 routes based on intents, entities, and/or context, each of intents, entities, and context as described above. The master bot 502 outputs to bot switch 594, which maintains context for all bots of the system 501, where context is as described above. The context may be shared with and/or among all or some of transfer bot 504, finance bot 506, FAQ bot 508, and/or Callback 595 module. Callback module 595 may include a return call to the user or customer, and/or escalation. In one embodiment, the transfer bot 504 is Watson Assistant. In one embodiment, finance bot 506 is Kasisto. In one embodiment, FAQ bot 508 is DialogFlow. The finance bot 506 outputs to the customer assist out 592.

The customer assist out 592 is similar in operation and features to that of the customer assist out 492 module of FIG. 4. Customer assist out 592 may produce final CCL (Conversation Control Language) response(s); regardless of which bot(s) were invoked, a final CCL is produced by Orchestrator and sent to the user client (e.g., web chat, voice) for interpretation for that channel.

The master bot 502 and bot switch 594 may use an initial bot conversation with the customer to establish their initial intent. The Bot Switch 594 may then in turn use that intent to proxy the conversation to a specify functional bot where the conversation continues. In other words, the initial customer intent is used to select/route the conversation to the appropriate functional bot.

System 503 of FIG. 5B is similar to system 501 of FIG. 5A in that it shares many components or modules yet differs in the arrangement of several of those modules. In system 503, a customer assist in 591 module, similar in operation and features to that of the customer assist in 491 module of FIG. 4, outputs to a bot switch 594. The bot switch 594 provides a call out to all bots (finance bot 506, FAQ bot 508, and transfer bot 504) in an open dialog turn. The bot switch 594 continues to keep dialogue or conversation data flowing to each of the three bots 506, 508, 504 until selection is made (via response rank 506 module) and/or control is handed off to another module of the system 503. Each of the finance bot 506, FAQ bot 508, and transfer bot 504 provide a response (based on the input received from the customer assist in 591 by way of bot switch 594) to the response rank 596 module. The response rank module 596 considers the set of responses from each of finance bot 506, FAQ bot 508, and transfer bot 504 and selects the best response, based on, for example, an intent confidence score, response availability, and context. The selected response is provided to the customer assist out 592 module (similar in operation and features to customer assist out 492 module of FIG. 4).

The response rank 596 module also provides the selected bot response top master bot 502 which in turn outputs to callback 595 module. Each Bot NLU engine has the capability of determine a confidence score that indicates how well an utterance matched to an intent. The score is usually between 0 and 100 with 100 being a perfect match. The response rank 596 and master bot 502 may use this score to filter and return the response with the highest score or take an alternative action (e.g., offer callback or escalate to agent) if all three scores are low.

The above embodiments may, in combination or separately, may utilize computer software and/or computer hardware (to include, for example, computer-readable mediums) for any of several functions such as automated control or measurement or sensing, and furthermore may utilize one or more graphical user interfaces for human interaction with modules or elements or components.

The exemplary systems and methods of this disclosure have been described in relation to integration and orchestration of intelligent systems. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects. A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An intelligent systems orchestration system comprising:
    an orchestration system engine comprising a computer processor and a system database, the computer processor having machine-executable instructions operating to:
        receive, from a user, a first channel data stream of a first channel protocol and a second channel data stream of a second channel protocol;
        engage a first NL bot of a first cognitive service and a second NL bot of a second cognitive service;
        create a normalized protocol first channel data stream of a standardized protocol from the first channel data stream, the normalized protocol first data stream configured for receipt by each of the first NI bot and the second NL bot;
        create a normalized protocol second channel data stream of a standardized protocol from a second channel data stream, the normalized protocol second data stream configured for receipt by each of the first NL bot and the second NL bot;
        provide the normalized protocol first channel data stream to the first NL bot and to the second NIL bot;
        provide the normalized protocol second channel data stream to the first NL bot and to the second NL bot;
        train the first NL bot using both of the normalized protocol first channel data stream and the normalized protocol second channel data stream;
        train the second NL bot using both of the normalized protocol first channel data stream and the normalized protocol second channel data stream;
        establish an interactive communication session between the user and both of the first NL bot and the second NL bot, the interactive communication session associated with the normalized protocol first channel data; and
        record channel conversation topic data associated with the interactive communication session.

2. The system of claim 1,
    wherein the first channel protocol is different than the second channel protocol.

3. The system of claim 1, wherein the first cognitive service has a different communication protocol than the second cognitive service.

4. The system of claim 2, wherein the first channel data stream is an analog voice channel and the second channel data stream is a digital data stream.

5. The system of claim 1, wherein the standardized protocol is JavaScript Object Notation.

6. The system of claim 1, wherein each of the normalized protocol first channel data stream and the normalized protocol second channel data stream are stored in the system database.

7. The system of claim 6, wherein the system database is an open source relational database.

8. The system of claim 1, wherein the first NL bot operates as a natural language bot and the second NL bot operates as a natural language bot.

9. The system of claim 2, wherein the first NL bot and the second NL bot are engaged with the user at the same time.

10. An intelligent systems orchestration system comprising:
- an orchestration system engine comprising a computer processor and a system database, the computer processor having machine-executable instructions operating to:
  - receive, from a user, a first channel data stream of a first channel protocol and a second channel data stream of a second channel protocol;
  - engage a first NL bot of a first cognitive service and a second NL bot of a second cognitive service;
  - create a normalized protocol first channel data stream of a standardized protocol from the first channel data stream, the normalized protocol first data stream configured for receipt by each of the first NL bot and the second NL bot;
  - create a normalized protocol second channel data stream of a standardized protocol from a second channel data stream, the normalized protocol second data stream configured for receipt by each of the first NL bot and the second NL bot;
  - provide the normalized protocol first channel data stream to the first NL bot and to the second NL bot;
  - provide the normalized protocol second channel data stream to the first NL bot and to the second NL bot;
  - train the first NL bot using both of the normalized protocol first channel data stream and the normalized protocol second channel data stream;
  - train the second NL bot using both of the normalized protocol first channel data stream and the normalized protocol second channel data stream; and
  - establish an interactive communication session between the user and both of the first NL bot and the second NL bot, the interactive communication session associated with the normalized protocol first channel data stream.

11. The system of claim 10, wherein the first cognitive service has a different communication protocol than the second cognitive service.

12. The system of claim 11, wherein the first channel data stream is one of an analog voice channel and a digital data stream.

13. The system of claim 12, wherein the first NL bot operates as a natural language bot and the second NL bot operates as a natural language bot.

14. A method of integrating multiple intelligent systems, comprising:
- providing an intelligent systems orchestration system comprising a user interface and an orchestration system engine, the orchestration system engine comprising a system database and a computer processor having machine-executable instructions;
- receiving, by the user interface, a first channel data stream of a first channel protocol and a second channel data stream of a second channel protocol;
- providing the first channel data stream and the second channel data stream to the computer processor;
- performing machine-executable instructions by the computer processor to:
  - engage a first NL bot of a first cognitive service and a second NL bot of a second cognitive service;
  - create a normalized protocol first channel data stream of a standardized protocol from the first channel data stream, the normalized protocol first data stream configured for receipt by each of the first NL bot and the second NL bot;
  - create a normalized protocol second channel data stream of a standardized protocol from a second channel data stream, the normalized protocol second data stream configured for receipt by each of the first NL bot and the second NL bot;
  - provide the normalized protocol first channel data stream to the first NL bot and to the second NL bot;
  - provide the normalized protocol second channel data stream to the first NL bot and to the second NL bot;
  - train both of the first NL bot and the second NL bot using both of the normalized protocol first channel data stream and the normalized protocol second channel data stream;
  - establish an interactive communication session between the user and both of the first NL bot and the second NL bot, the interactive communication session associated with the normalized protocol first channel data stream; and
- record channel conversation topic data associated with the interactive communication session.

15. The method of claim 14, wherein the first channel protocol is different than the second channel protocol.

16. The method of claim 14, wherein the first cognitive service has a different communication protocol than the second cognitive service.

17. The method of claim 15, wherein the first channel data stream is an analog voice channel and the second channel data stream is a digital data stream.

18. The method of claim 14, wherein the first NL bot operates as a natural language bot and the second NL bot operates as a natural language bot.

19. The method of claim 14, wherein each of the normalized protocol first channel data stream and the normalized protocol second channel data stream are stored in the system database.

20. The method of claim 14, wherein the first NI bot and the second NL bot are engaged with the user at the same time.

* * * * *